United States Patent
Lu et al.

(10) Patent No.: US 9,917,523 B1
(45) Date of Patent: Mar. 13, 2018

(54) CONTROL METHODS AND SWITCHING MODE POWER SUPPLIES WITH IMPROVED DYNAMIC RESPONSE AND REDUCED SWITCHING LOSS

(71) Applicant: Leadtrend Technology Corporation, Zhubei, Hsinchu County (TW)

(72) Inventors: Hsin Hung Lu, Zhubei (TW); Kuan Hsien Chou, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 15/692,562

(22) Filed: Aug. 31, 2017

(30) Foreign Application Priority Data

Sep. 1, 2016 (TW) .............................. 105128218 A (51) Int. Cl.
| | |
|---|---|
| H02M 3/335 | (2006.01) |
| H02M 3/156 | (2006.01) |
| H02M 1/42 | (2007.01) |
| H02M 7/217 | (2006.01) |
| H02M 3/18 | (2006.01) |
| H02M 1/096 | (2006.01) |
| H02M 1/00 | (2006.01) |

(52) U.S. Cl.
CPC ....... *H02M 3/33523* (2013.01); *H02M 1/096* (2013.01); *H02M 1/4258* (2013.01); *H02M 3/156* (2013.01); *H02M 3/18* (2013.01); *H02M 7/2176* (2013.01); *H02M 2001/0032* (2013.01); *H02M 2003/1566* (2013.01)

(58) Field of Classification Search
CPC .... H02M 3/33523; H02M 1/08; H02M 3/156; H02M 3/18; H02M 1/096; H02M 1/4258; H02M 7/2176; H02M 2001/0009; H02M 2001/0032; H02M 2003/1566
See application file for complete search history.

(56) References Cited

U.S. PATENT DOCUMENTS

| | | | |
|---|---|---|---|
| 2012/0195076 A1* | 8/2012 | Zhang ............... | H02M 3/33523 363/21.12 |
| 2014/0362608 A1* | 12/2014 | Yang ................. | H02M 3/33576 363/21.01 |
| 2015/0062981 A1* | 3/2015 | Fang ................. | H02M 3/33507 363/21.17 |

(Continued)

*Primary Examiner* — Emily P Pham
(74) *Attorney, Agent, or Firm* — McClure, Qualey & Rodack, LLP (57) ABSTRACT

A control method is used in a switching mode power supply to improve dynamic load response and switching loss. A PWM signal is provided to control a power switch and has a switching frequency. A cross voltage of a transformer in the switching mode power supply is detected to provide a de-magnetization time. The switching frequency is controlled in response to a sleep signal and a compensation voltage, which is generated based on an output voltage of the switching mode power supply. The sleep signal is provided in response to the de-magnetization time and a current sense signal, a representative of a winding current of the transformer. The switching frequency is not less than a first minimum value if the sleep signal is deasserted, and not less than a second minimum value if the sleep signal is asserted. The second minimum value is less than the first minimum value.

18 Claims, 5 Drawing Sheets

(56) References Cited

U.S. PATENT DOCUMENTS

| | | | | |
|---|---|---|---|---|
| 2016/0241150 A1* | 8/2016 | Hsu | ............... | H02M 3/33523 |
| 2017/0187295 A1* | 6/2017 | Chen | ............... | H02M 3/33515 |
| 2017/0214325 A1* | 7/2017 | Chang | ............... | H02M 1/08 |
| 2017/0288553 A1* | 10/2017 | Fahlenkamp | ..... | H02M 3/33515 |

* cited by examiner

CONTROL METHODS AND SWITCHING MODE POWER SUPPLIES WITH IMPROVED DYNAMIC RESPONSE AND REDUCED SWITCHING LOSS

CROSS-REFERENCE TO RELATED APPLICATION

This application claims priority to and the benefit of Taiwan Application Series Number 105128218 filed on Sep. 1, 2016, which is incorporated by reference in its entirety.

BACKGROUND

The present disclosure relates generally to switching mode power supply, and more particularly to switching mode power supplies with primary side control (PSC).

Almost all electronic appliances require power supplies. A power supply converts for example an alternating-current (AC) voltage of a power grid into a power source with specific ratings demanded by the core circuit of an electronic appliance. Among all kind of power supplies, switching mode power supplies are known to be compact in size and efficient in power conversion, and therefore they are broadly adopted by power supply manufactures. Switching mode power supplies normally use pulse width modulation (PWM) technology to control power conversion.

In order to avoid overstress damage or explosion happening to electronic appliances because of lightning strike to a power grid, official regulations in many countries mandate isolation between primary and second sides in power supplies, meaning there is no direct-current (DC) allowed to flow between the primary and second sides. The voltage levels at the primary side are all in reference to the input ground of the power grid, and those at the secondary side to a floating ground.

Switching mode power supplies could be controlled by providing a PWM signal to manipulate a power switch at a primary side, so as to control the power conversion from the primary side to a secondary side and make an output voltage of a power supply meet specific ratings. For example, the output voltage should be regulated to be within a tolerance range centering on 5 volt.

Primary side control (PSC) is known to use only information at a primary side for regulating an output voltage at a secondary side. A power controller at the primary side senses a reflective voltage on a winding of a transformer to detect indirectly the output voltage, so as to control power conversion. Secondary side control (SSC) nevertheless has circuits at a secondary side to detect directly an output voltage, and passes resulted information to a power controller at a primary side through an isolation device such as a photo coupler.

Figure 1:
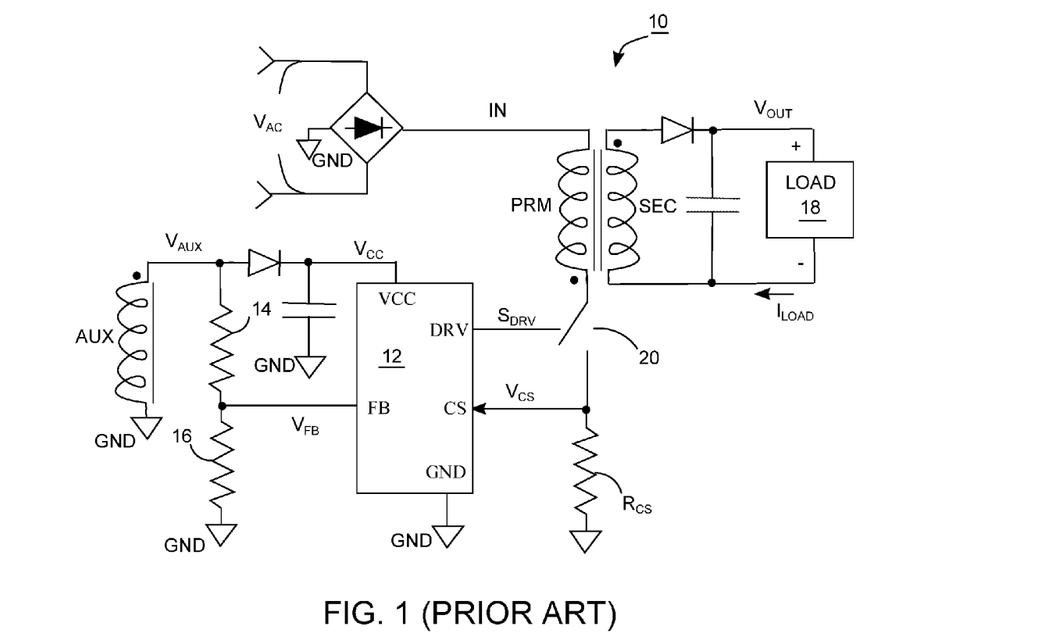
FIG. 1 demonstrates a conventional switching mode power supply with PSC.

FIG. 1 demonstrates a switching mode power supply 10 with PSC. Power controller 12 has a current sense node CS, operating voltage node VCC, drive node DRV, feedback node FB, and input ground node GND. A transformer comprises primary winding PRM, auxiliary winding AUX and secondary winding SEC, all inductively coupled to one another. Power controller 12 at the primary side indirectly senses the output voltage $V_{OUT}$ at the secondary side during a period of time when the transformer is demagnetizing, by way of the signal path provided by feedback node FB, resisters 14 and 16, auxiliary winding AUX, and secondary winding SEC. Power controller 12 accordingly provides PWM signal $S_{DRV}$ to make the transformer magnetize or demagnetize.

Figure 2:
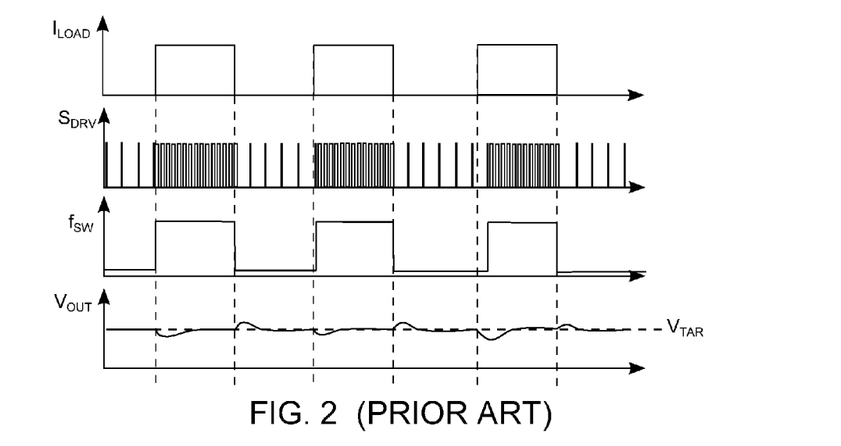
FIG. 2 shows dynamic load testing to the switch mode power supply of FIG. 1 and the results.

Dynamic load testing tests how a power supply responds when its load changes in a severe and repetitive manner. FIG. 2 shows dynamic load testing to switch mode power supply 10 and the results, including the waveforms of current load $I_{LOAD}$ passing through load 18, PWM signal $S_{DRV}$, switching frequency $f_{SW}$, and output voltage $V_{OUT}$. As shown in FIG. 2, during dynamic load testing, load 18 of switching mode power supply 10 is controlled to jump back and forth between a heavy-load condition and a no-load condition. Switching frequency $f_{SW}$ of PWM signal $S_{DRV}$ becomes high under the heavy-load condition and low under the no-load condition. When load 18 changes, output voltage $V_{OUT}$ due to limited bandwidth of the feedback loop that tries to keep it at target voltage $V_{TAR}$, drifts away temporarily, generating overshoot or undershoot. The less overshoot and undershoot the better regulation ability of s power supply, and the better dynamic load response.

Optimization of the switching frequency $f_{SW}$ under a no-load condition is tricky though. To enjoy less switching loss and higher power conversion efficiency, the switching frequency $f_{SW}$ of PWM signal $S_{DRV}$ needs to be low under a no-load condition, as indicated in FIG. 2. The less switching frequency $f_{SW}$ benefits a PSC switching mode power supply in power conversion efficiency, but possibly at the expenses of dynamic load response. As power controller 12 with PSC in FIG. 1 senses output voltage $V_{OUT}$ only during demagnetizing of the transformer, and is blind to any change in output voltage $V_{OUT}$ before the next time of demagnetizing, a low switching frequency $f_{SW}$ for a no-load condition could cause serious undershoot if load 18 happens to become heavy right after the demagnetizing of the transformer, rendering poor dynamic load response.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 3:
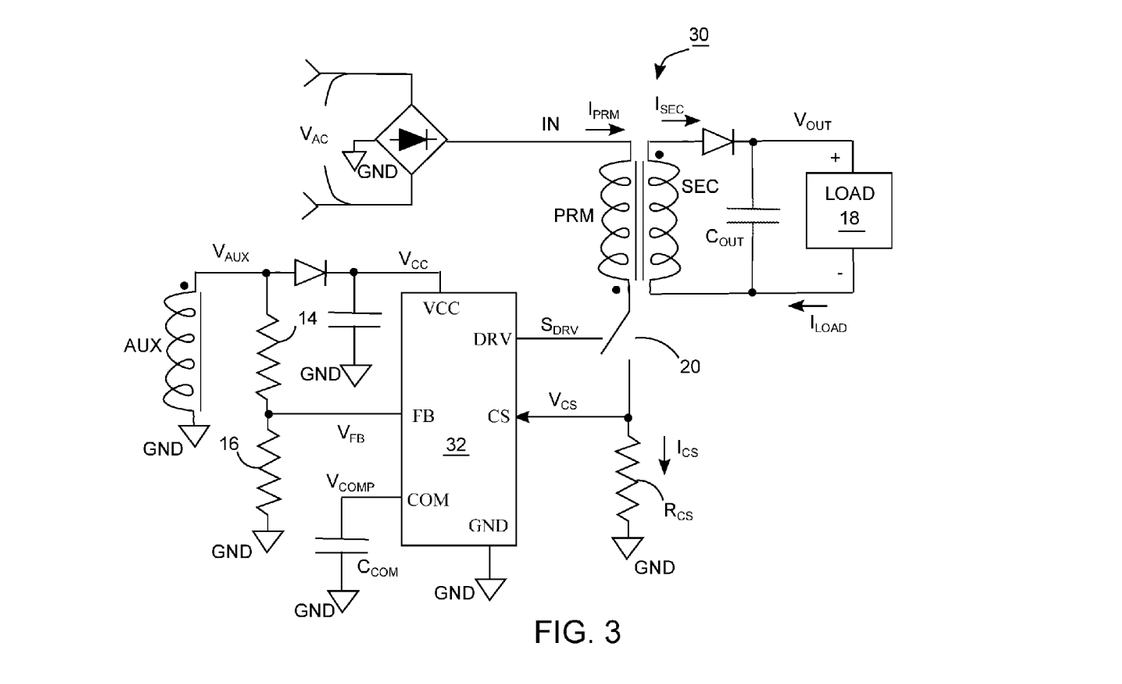
FIG. 3 demonstrates a switching mode power supply according to embodiments of the invention.

FIG. 3 demonstrates a switching mode power supply 30 according to embodiments of the invention. A transformer comprises primary winding PRM, auxiliary winding AUX and secondary winding SEC, all inductively coupled to one another. A diode and output capacitor $C_{OUT}$ at the secondary side forms a rectifier to rectify the AC signal across secondary winding SEC, and to generate output voltage $V_{OUT}$.

Power controller 32 provides PWM signal $S_{DRV}$ to manipulate power switch 20 at a primary side. Power controller 32 has compensation node COM connected to compensation capacitor $C_{COM}$. Current sense resistor $R_{CS}$, power switch 20, and primary wilding PRM are connected in series between input power line IN and input ground line GND. Current sense resistor $R_{CS}$ feeds to power controller 32 current sense voltage $V_{CS}$, which is substantially equivalent to current $I_{CS}$ and could be a representative of winding current $I_{PRM}$ flowing through power switch 20 and primary winding PRM of the transformer.

Figure 4:
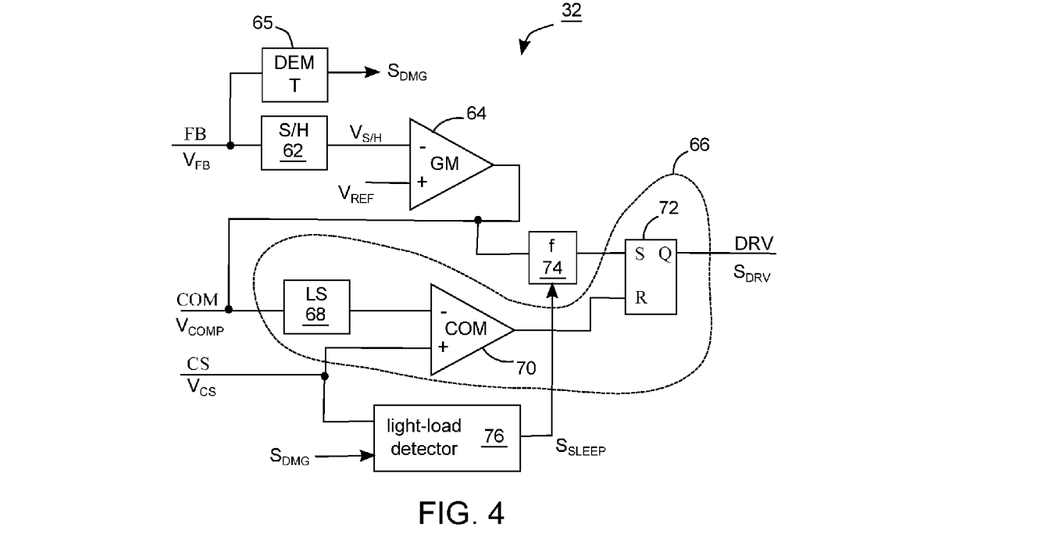
FIG. 4 illustrates the power controller in FIG. 3.
Figure 5:
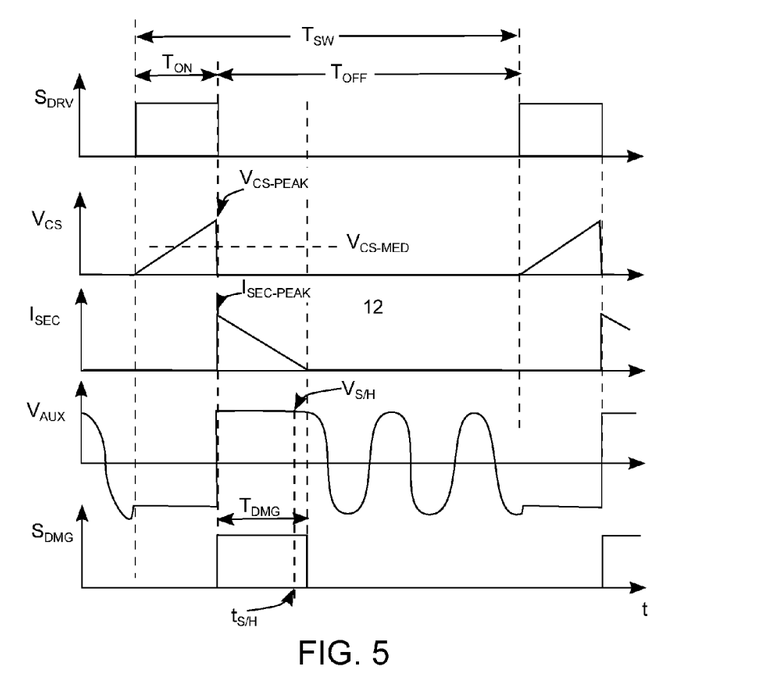
FIG. 5 demonstrates some waveforms for signals in FIG. 4.

FIG. 4 illustrates power controller 32 of FIG. 3, and FIG. 5 demonstrates some waveforms for signals in FIG. 4.

Sample-and-hold circuit 62 and transconductor 64 act together as an error amplifier to detect output voltage $V_{OUT}$ and generate compensation voltage $V_{COMP}$.

Sample-and-hold circuit 62 is connected to feedback node FB, detecting output voltage $V_{OUT}$ at the secondary side via the signal path passing through resistors 14 and 16, auxiliary wilding AUX, and secondary winding SEC, during the demagnetizing of the transformer. For example, sample-and-hold circuit 62 samples feedback voltage $V_{FB}$ at feedback node FB at moment $t_{S/H}$ to hold and/or update voltage sample $V_{S/H}$, which represents or corresponds to output voltage $V_{OUT}$.

Transconductor 64 compares voltage sample $V_{S/H}$ with a reference voltage $V_{REF}$, and its output accordingly charges or discharges compensation capacitor $C_{COM}$ to generate compensation voltage $V_{COMP}$. If voltage sample $V_{S/H}$ drifts away from reference voltage $V_{REF}$, it implies output voltage $V_{OUT}$ no more equals to target voltage $V_{TAR}$, so compensation voltage $V_{COMP}$, in response, varies to increase or decrease the power conversion of switching mode power supply 30. Generally speaking, the less load 18 the lower compensation voltage $V_{COMP}$.

In FIG. 4, compensation voltage $V_{COMP}$ controls PWM controller 66 to influence an ON time $T_{ON}$ of PWM signal $S_{DRV}$. As shown in FIG. 5, an On time $T_{ON}$ is a time period when PWM signal $S_{DRV}$ is in logic "1" level and turns ON power switch 20. During an ON time $T_{ON}$, current sense signal $V_{CS}$ increases in a linear manner. When current sense signal $V_{CS}$ exceeds a level-shifted version of compensation voltage $V_{COMP}$ outputted by level shifter 68, comparator 70 resets SR flip flop 72, making PWM signal $S_{DRV}$ in logic 0, concluding an ON time $T_{ON}$, and starting an OFF time $T_{OFF}$. So power switch 20 is turned OFF and current sense signal $V_{CS}$ drops abruptly back to 0V. Compensation voltage $V_{COMP}$ equally determines peak $V_{CS\text{-}PEAK}$ of current sense signal $V_{CS}$, and the length of an ON time. It could be observed that a higher compensation voltage $V_{COMP}$ causes a higher peak $V_{CS\text{-}PEAK}$ and a longer ON time $T_{ON}$.

De-magnetization detector 65 detects voltage drop $V_{AUX}$ of auxiliary winding AUX via feedback node FB, resistors 14 and 16, to provide de-magnetization time $T_{DMG}$. In one embodiment, de-magnetization detector 65 compares feedback voltage $V_{FB}$ with voltage sample $V_{S/H}$ to generate de-magnetization signal $S_{DMG}$, which determines de-magnetization time $T_{DMG}$ as shown in FIG. 5. During de-magnetization time $T_{DMG}$, because the transformer is releasing energy, secondary winding SEC outputs winding current $I_{SEC}$ to charge output capacitor $C_{OUT}$ or to power load 18. De-magnetization time $T_{DMG}$ is about the time period when winding current $I_{SEC}$ is positive, as shown in FIG. 5.

Light-load detector 76 provides sleep signal $S_{SLEEP}$ to frequency controller 74 in response to de-magnetization time $T_{DMG}$ and current sense signal $V_{CS}$. Light-load detector 76 could acknowledge the total charge output from secondary winding SEC during a switching cycle based on de-magnetization time $T_{DMG}$ and current sense signal $V_{CS}$. In other words, light-load detector 76 could know the average output current forwarded from secondary winding SEC to load 18, and this average output current should be equal to current load $I_{LOAD}$. If light-load detector 76 holds that current load $I_{LOAD}$ is steadily below a certain level, it asserts sleep signal $S_{SLEEP}$. If not, light-load detector 76 deasserts sleep signal $S_{SLEEP}$. The detail of light-load detector 76 will be explained later.

Figure 6:
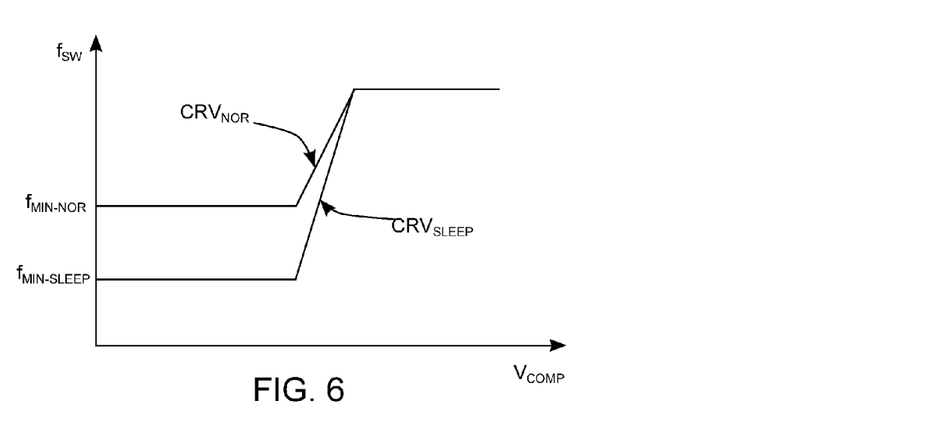
FIG. 6 demonstrates two transfer curves $CRV_{NOR}$ and $CRV_{SLEEP}$, each showing a relationship between compensation voltage $V_{COMP}$ and switching frequency $f_{SW}$.

Frequency controller 74, in response to compensation voltage $V_{COMP}$ and sleep signal $S_{SLEEP}$, determines switching frequency $f_{SW}$ of PWM signal $S_{DRV}$, which is the reciprocal of switching time $T_{SW}$ consisting of an ON time $T_{ON}$ and an OFF time $T_{OFF}$. Frequency controller 74 determines the moment to set SR flip flop 72, making PWM signal $S_{DRV}$ in logic 1, concluding an OFF time $T_{OFF}$, and starting an ON time $T_{ON}$. The higher compensation voltage $V_{COMP}$ could cause a shorter switching time $T_{SW}$ and a higher switching frequency $f_{SW}$. According to embodiments of the invention, frequency controller 74 could provide two transfer curves $CRV_{NOR}$ and $CRV_{SLEEP}$, each showing a relationship between compensation voltage $V_{COMP}$ and switching frequency $f_{SW}$, as shown in FIG. 6. When sleep signal $S_{SLEEP}$ is deasserted, it is transfer curve $CRV_{NOR}$ frequency controller 74 provides; when sleep signal $S_{SLEEP}$ is asserted, it is transfer curve $CRV_{SLEEP}$ though. Transfer curve $CRV_{NOR}$ in FIG. 6 shows a minimum value $f_{MIN\text{-}NOR}$, which switching frequency $f_{SW}$ cannot be less than when sleep signal $S_{SLEEP}$ is deasserted. Similarly, transfer curve $CRV_{SLEEP}$ shows another minimum value $f_{MIN\text{-}SLEEP}$ which is less than minimum value $f_{MIN\text{-}NOR}$. Frequency controller 74 makes switching frequency $f_{SW}$ not less than minimum value $f_{MIN\text{-}NOR}$ if sleep signal $S_{SLEEP}$ is deasserted, and not less than minimum value $f_{MIN\text{-}SLEEP}$ if sleep signal $S_{SLEEP}$ is asserted.

Figure 7:
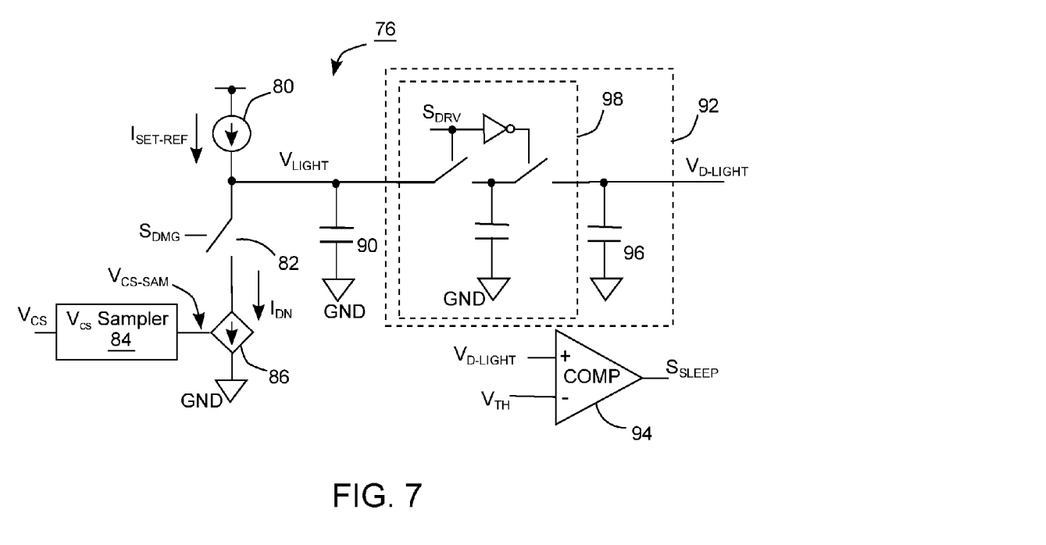
FIG. 7 demonstrates the light-load detector in FIG. 4.

FIG. 7 demonstrates light-load detector 76 in FIG. 4, which includes constant current source 80, switch 82, sampler 84, voltage-to-current converter 86, delay circuit 92, and comparator 94. Sampler 84 samples current sense signal $V_{CS}$ to provide voltage sample $V_{CS\_SAM}$. According to embodiments of the invention, voltage sample $V_{CS\text{-}SAM}$ could be peak $V_{CS\text{-}PEAK}$ but this invention is not limited to. According to other embodiments of the invention, voltage sample $V_{CS\text{-}SAM}$ is middle $V_{CS\text{-}MED}$ which is the current sense signal $V_{CS}$ at the middle moment of an ON time $T_{ON}$. Voltage-to-current converter 86 converts voltage sample $V_{CS\_SAM}$ into current $I_{DN}$ to discharge capacitor 90 during de-magnetization time $T_{DMG}$ indicated by de-magnetization signal $S_{DMG}$. Constant current source 80 provides constant current $I_{SET\text{-}REF}$ to continuously charge capacitor 90. What current $I_{DN}$ does is discharging capacitor 90, and is opposite to what constant current $I_{SET\_REF}$ does, which is charging capacitor 90. Change $dV_{LIGHT}$ in capacitor voltage $V_{LIGHT}$ after the elapse of one switching cycle $T_{SW}$ can be expresses by the following equation.

$$\begin{aligned}
dV_{LIGHT} &= dQ_{90} / C_{90} \\
&= (I_{SET-REF} \times T_{SW} - I_{DN} \times T_{DMG}) / C_{90} \\
&= (I_{SET-REF} \times T_{SW} - K_1 \times I_{CS-PEAK} \times T_{DMG}) / C_{90} \\
&= (I_{SET-REF} \times T_{SW} - K_2 \times I_{SEC-PEAK} \times T_{DMG}) / C_{90} \\
&= (I_{SET-REF} \times T_{SW} - K_2 \times I_{LOAD} \times T_{SW}) / C_{90} \\
&= K_3 \times (I_{SET} - I_{LOAD}) \times T_{SW} / C_{90},
\end{aligned}$$

where $dQ_{90}$ is the variation of charge stored in capacitor 90, $C_{90}$ the capacitance of capacitor 90, $K_1$, $K_2$ and $K_3$ all constant, $I_{SEC\_PEAK}$ the winding current peak of secondary winding SEC, and $I_{SET}$ a predetermined current corresponding to constant current $I_{SET-REF}$. Derivable from the equation above, if current load $I_{LOAD}$ is less than predetermined current $I_{SET}$, change $dV_{LIGHT}$ is positive, meaning capacitor voltage $V_{LIGHT}$ increases switching cycle by switching cycle. In the opposite, if current load $I_{LOAD}$ exceeds predetermined current $I_{SET}$, capacitor voltage $V_{LIGHT}$ decreases switching cycle by switching cycle. From one perspective, constant current source 80, switch 82, sampler 84 and voltage-to-current converter 86 work together at the primary side to detect current load $I_{LOAD}$ at the secondary side and compare it with predetermined current $I_{SET}$.

Delay circuit 92 determines signal delay $T_{DELAY}$, and could be as simple as a resistor-capacitor circuit in some embodiments of the invention. In FIG. 7, delay circuit 92 has capacitor 96 and switched-capacitor circuit 98, where switched-capacitor circuit 98, acting as a frequency-controlled resistor, has two switches controlled by inverted and non-inverted versions of PWM signal $S_{DRV}$ respectively. Delay circuit 92 provides signal delay $T_{DELAY}$ to capacitor voltage $V_{LIGHT}$, and accordingly generates capacitor voltage $V_{D\_LIGHT}$.

Comparator 94 compares capacitor voltage $V_{D-LIGHT}$ with threshold voltage $V_{TH}$ to output sleep signal $S_{SLEEP}$. If capacitor voltage $V_{D-LIGHT}$ exceeds threshold voltage $V_{TH}$, sleep signal $S_{SLEEP}$ is asserted, and if not, sleep signal $S_{SLEEP}$ is deasserted.

Figure 8:
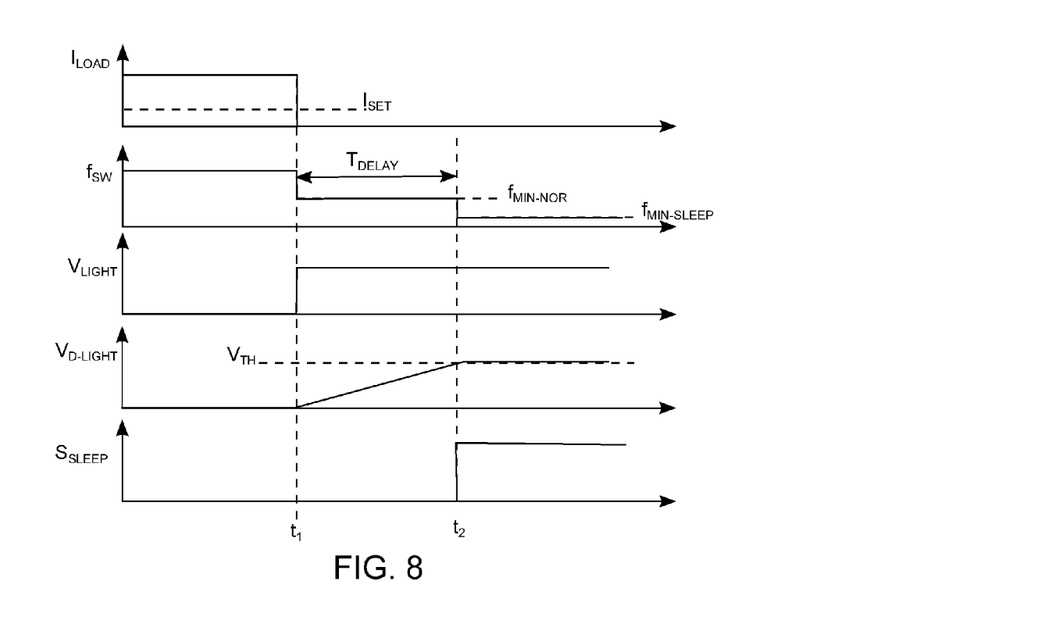
FIG. 8 shows waveforms of some signals of the switching mode power supply in FIG. 3 when a load changes from a heavy-load condition into a no-load condition and stays at the no-load condition for a very long time.

FIG. 8 shows waveforms of some signals of switching mode power supply 30 when load 18 changes from a heavy-load condition into a no-load condition and stays at the no-load condition for a very long time. It is supposed that, in the beginning of FIG. 8, load 18 is heavy, current load $I_{LOAD}$ high, switching frequency $f_{SW}$ high, capacitor voltages $V_{LIGHT}$ and $V_{D\_LIGHT}$ staying at a minimum value, and sleep signal $S_{SLEEP}$ deasserted. At moment $t_1$, load 18, changing into a no-load condition, suddenly disappears, and current load $I_{LOAD}$ becomes 0 A. In response to the change in load 18, compensation voltage $V_{COMP}$ drops quickly and deeply, and in view of transfer curve $CRV_{NOR}$, switching frequency $f_{SW}$ drops to minimum value $f_{MIN\_NOR}$ soon after moment $t_1$. At the same time, since current load $I_{LOAD}$ is 0 A, much less than predetermined current $I_{SET}$ so capacitor voltage $V_{LIGHT}$ ramps up sharply to reach its maximum. Due to the existence of delay circuit 92, capacitor voltage $V_{D-LIGHT}$ nevertheless ramps up in a slower manner, and passes across threshold voltage $V_{TH}$ at moment $t_2$, which is signal delay $T_{DELAY}$ later than moment $t_1$. So, at moment $t_2$, sleep signal $S_{SLEEP}$ switches to become asserted, and frequency controller 74 turns to provide transfer curve $CRV_{SLEEP}$. Based on transfer curve $CRV_{SLEEP}$ and the current value of compensation voltage $V_{COMP}$, switching frequency $f_{SW}$ becomes minimum value $f_{MIN-SLEEP}$, which is less than minimum value $f_{MIN-NOR}$. FIG. 8 shows, if load 18 stays in a no-load condition for a very long time, switching frequency $f_{SW}$ is expected to be minimum value $f_{MIN-SLEEP}$ eventually, in favor of the reduction of switching loss. It looks like a long stay in a no-load condition makes switching mode power supply 30 sound asleep to save power.

Figure 9:
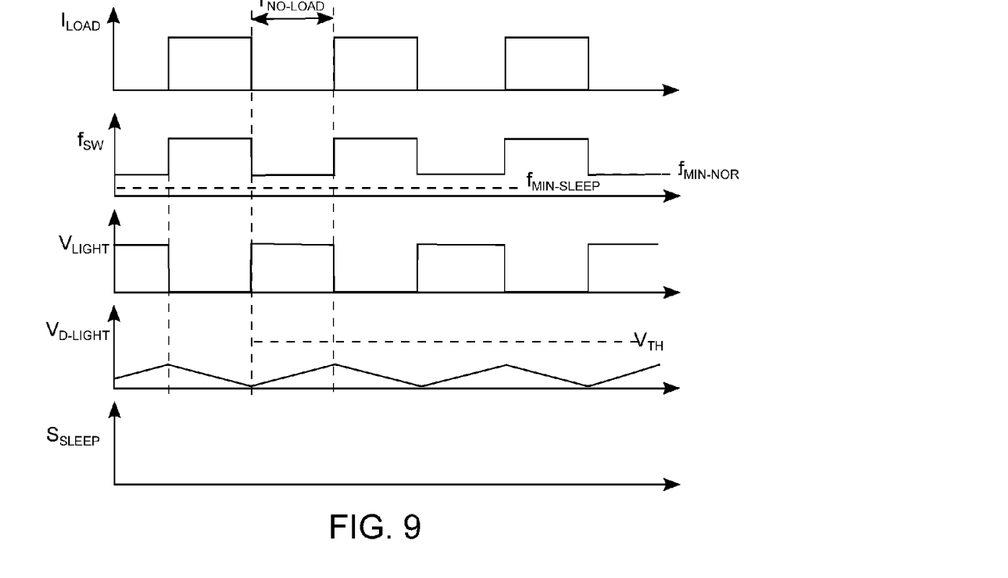
FIG. 9 demonstrates a test result of the switching mode power supply in FIG. 3 under dynamic load testing.

FIG. 9 demonstrates a test result of switching mode power supply 30 in FIG. 3 under dynamic load testing. As shown in FIG. 9, during dynamic load testing, each time period when load 18 stays in a no-load condition is denoted as no-load time $T_{NO-LOAD}$, and signal delay $T_{DELAY}$ is chosen or designed to be longer than no-load time $T_{NO\_LOAD}$. Before it goes up across threshold voltage $V_{TH}$, capacitor voltage $V_{D-LIGHT}$ in FIG. 9 starts being pulled down when load 18 switches to be in a heavy-load condition. Under the dynamic load testing in FIG. 9, capacitor voltage $V_{D-LIGHT}$ accordingly can never reach threshold voltage $V_{TH}$ and sleep signal $S_{SLEEP}$ is deasserted all the time. During each no-load time $T_{NO-LOAD}$ of FIG. 9, frequency controller 74 always provides transfer curve $CRV_{NOR}$, which makes switching frequency $f_{SW}$ not less than minimum value $f_{MIN-NOR}$, higher than minimum value $f_{MIN-SLEEP}$. Minimum value $f_{MIN-NOR}$, in comparison with minimum value $f_{MIN-SLEEP}$, benefits switching mode power supply 30 in quicker response to the change in load 18, because the period of time when power controller 32 is blind to output voltage $V_{OUT}$ is shorter. Switching mode power supply 30 could avoid severe undershoot during dynamic load testing.

Figure 10:
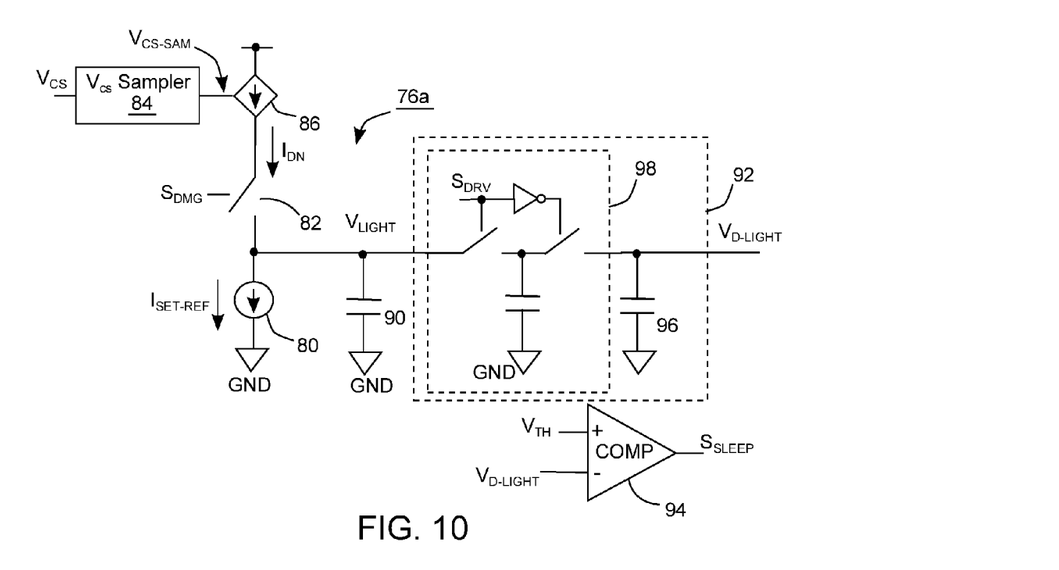
FIG. 10 shows another light-load detector.

FIG. 7 is only an example of light-load detector 76 and this invention is not limited to. FIG. 10 shows another light-load detector 76a, capable of replacing light-load detector 76 according to embodiments of the invention. Detail of FIG. 10 is omitted here because its function and operation can be derived and understood based on the explanation regarding to light-load detector 76.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for a switching mode power supply with a transformer and a power switch, comprising:
   providing a PWM signal to control the power switch, wherein the PWM signal has a switching frequency;
   detecting a cross voltage of the transformer to provide a de-magnetization time;
   controlling the switching frequency in response to a compensation voltage and a sleep signal, wherein the compensation voltage is generated based on an output voltage of the switching mode power supply;
   providing the sleep signal in response to the de-magnetization time and a current sense signal, wherein the current sense signal is a representative of a winding current of the transformer;
   making the switching frequency not less than a first minimum value if the sleep signal is deasserted; and
   making the switching frequency not less than a second minimum value if the sleep signal is asserted,
   wherein the second minimum value is less than the first minimum value.

2. The control method as claimed in claim 1, comprising:
   converting the current sense signal into a first current;
   using the first current to perform a first action to a capacitor during the de-magnetization time;
   using a second current to continuously perform a second action to the capacitor wherein the second action is opposite to the first action; and
   generating the sleep signal in response to a first capacitor voltage of the capacitor.

3. The control method as claimed in claim 2, comprising:
   delaying the first capacitor voltage to provide a second capacitor voltage; and
   comparing the second capacitor voltage with a threshold voltage to generate the sleep signal.

4. The control method as claimed in claim 1, comprising:
    detecting the cross voltage to provide a voltage sample representing the output voltage; and
    comparing the voltage sample with a reference voltage to provide the compensation voltage.

5. The control method as claimed in claim 4, wherein the voltage sample is updated during the de-magnetization time.

6. A power controller for a switching mode power supply with a transformer and a power switch, comprising:
    a PWM controller for providing to the power switch a PWM signal in response to a compensation voltage, wherein the PWM signal has a switching frequency;
    a de-magnetization detector for providing a de-magnetization time by detecting a cross voltage of the transformer;
    a frequency controller for controlling the switching frequency in response to the compensation voltage and a sleep signal; and
    a light-load detector, for providing the sleep signal in response to the de-magnetization time and a current sense signal, wherein the current sense signal is a representative of a winding current through the transformer;
    wherein the frequency controller makes the switching frequency not less than a first minimum value if the sleep signal is deasserted, and makes the switching frequency a second minimum value less than the first value if the sleep signal is asserted.

7. The power controller as claimed in claim 6, wherein the light-load detector comprises:
    a voltage-to-current converter for converting the current sense signal into a first current used to perform a first action to a first capacitor during the de-magnetization time; and
    a first current source for providing a second current to continuously perform a second action to the first capacitor;
    wherein the second action is opposite to the first action.

8. The power controller as claimed in claim 7, wherein the light-load detector comprises:
    a delay circuit connected to the first capacitor, for delaying a first capacitor voltage on the first capacitor to provide a second capacitor voltage.

9. The power controller as claimed in claim 8, wherein the delay circuit includes a switched-capacitor circuit.

10. The power controller as claimed in claim 8, wherein the light-load detector comprises:
    a comparator for comparing the second capacitor voltage with a threshold voltage to generate the sleep signal.

11. The power controller as claimed in claim 6, wherein the frequency controller concludes an OFF time of the PWM signal.

12. A switching mode power supply, comprising:
    a transformer with a primary winding, a secondary winding and an auxiliary winding, inductively coupled to one another;
    a power switch for controlling a winding current through the primary winding;
    a rectifier connected to the secondary winding for providing an output voltage;
    a power controller comprising:
        a PWM controller for providing to the power switch a PWM signal with a switching frequency;
        an error amplifier for detecting the output voltage via the auxiliary winding to generate a compensation voltage;
        de-magnetization detector for providing a de-magnetization time by sensing a cross voltage of the auxiliary winding;
        a frequency controller for controlling the switching frequency in response to the compensation voltage and a sleep signal; and
        a light-load detector, for providing the sleep signal in response to the de-magnetization time and a current sense signal, wherein the current sense signal is a representative of the winding current;
        wherein the frequency controller makes the switching frequency not less than a first minimum value if the sleep signal is deasserted, and makes the switching frequency not less than a second minimum value less than the first minimum value if the sleep signal is asserted.

13. The switching mode power supply as claimed in claim 12, wherein the compensation voltage determines a peak of the current sense signal.

14. The switching mode power supply as claimed in claim 12, wherein the error amplifier comprises:
    a sample-and-hold circuit for detecting the output voltage via the auxiliary winding to hold a voltage sample; and
    a transconductor for comparing the voltage sample with a reference voltage to generate the compensation voltage.

15. The switching mode power supply as claimed in claim 12, wherein the light-load detector comprises:
    a voltage-to-current converter for converting the current sense signal into a first current used to perform a first action to a first capacitor during the de-magnetization time; and
    a first current source for providing a second current to continuously perform a second action to the first capacitor;
    wherein the second action is opposite to the first action.

16. The switching mode power supply as claimed in claim 15, wherein the light-load detector comprises:
    a delay circuit connected to the first capacitor, for delaying a first capacitor voltage on the first capacitor to provide a second capacitor voltage.

17. The switching mode power supply as claimed in claim 15, wherein the delay circuit includes a switched-capacitor circuit.

18. The switching mode power supply as claimed in claim 12, wherein the frequency controller concludes an OFF time of the PWM signal.

* * * * *